(12) United States Patent
Park et al.

(10) Patent No.: US 11,107,201 B2
(45) Date of Patent: Aug. 31, 2021

(54) ELECTRONIC DEVICE FOR PROCESSING IMAGE AND IMAGE PROCESSING METHOD THEREOF

(71) Applicant: SAMSUNG ELECTRONICS CO., LTD., Suwon-si (KR)

(72) Inventors: Sanguk Park, Suwon-si (KR); Bongsoo Jung, Suwon-si (KR); Changho Kim, Suwon-si (KR); Jungwon Lee, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/794,583

(22) Filed: Feb. 19, 2020

(65) Prior Publication Data

US 2020/0265561 A1 Aug. 20, 2020

(30) Foreign Application Priority Data

Feb. 19, 2019 (KR) .................. 10-2019-0019199

(51) Int. Cl.
*G06T 5/00* (2006.01)
(52) U.S. Cl.
CPC .... *G06T 5/007* (2013.01); *G06T 2207/20208* (2013.01)
(58) Field of Classification Search
None
See application file for complete search history.

(56) References Cited

U.S. PATENT DOCUMENTS

| 9,942,489 | B2 | 4/2018 | Tao et al. |
| 10,075,655 | B2 | 9/2018 | Tao et al. |
| 10,115,022 | B2 | 10/2018 | Kim et al. |
| 10,116,938 | B2 | 10/2018 | Minoo et al. |
| 10,136,074 | B2 | 11/2018 | Tao et al. |
| 10,165,198 | B2 | 12/2018 | Tao et al. |
| 2014/0092012 | A1* | 4/2014 | Seshadrinathan ....... G06T 5/007 345/157 |

(Continued)

FOREIGN PATENT DOCUMENTS

| KR | 10-2005-0054729 | 6/2005 |
| KR | 10-2016-0040981 | 4/2016 |

(Continued)

OTHER PUBLICATIONS

International Search Report and Written Opinion dated Jun. 1, 2020 in counterpart International Patent Application No. PCT/KR2020/002347.

*Primary Examiner* — Michelle Chin
(74) *Attorney, Agent, or Firm* — Nixon & Vanderhye, P.C.

(57) ABSTRACT

Disclosed is an electronic device including a memory and a processor electrically connected with the memory. The memory stores instructions that, when executed, cause the processor to control the electronic device to: obtain information about a maximum value of brightness of image content based on metadata of the image content, to perform tone mapping on at least one or more frames corresponding to a preview image of the image content based on the information about the maximum value of the brightness, and to output the preview image based on the at least one or more frames on which the tone mapping is performed, on a display device.

20 Claims, 9 Drawing Sheets

(56) References Cited

U.S. PATENT DOCUMENTS

| | | |
|---|---|---|
| 2016/0104438 A1 | 4/2016 | Han et al. |
| 2016/0117559 A1 | 4/2016 | Kim et al. |
| 2016/0360171 A1 | 12/2016 | Tao et al. |
| 2017/0026646 A1 | 1/2017 | Minoo et al. |
| 2017/0272690 A1 | 9/2017 | Seifi et al. |
| 2018/0302548 A1* | 10/2018 | Bao .................. H04N 5/2251 |
| 2019/0027100 A1 | 1/2019 | Han et al. |
| 2019/0028706 A1 | 1/2019 | Minoo et al. |

FOREIGN PATENT DOCUMENTS

| | | |
|---|---|---|
| KR | 10-2016-0045404 | 4/2016 |
| KR | 10-2016-0138865 | 12/2016 |

\* cited by examiner

ELECTRONIC DEVICE FOR PROCESSING IMAGE AND IMAGE PROCESSING METHOD THEREOF

CROSS-REFERENCE TO RELATED APPLICATION

This application is based on and claims priority under 35 U.S.C. § 119 to Korean Patent Application No. 10-2019-0019199, filed on Feb. 19, 2019, in the Korean Intellectual Property Office, the disclosure of which is incorporated by reference herein its entirety.

BACKGROUND

1. Field

The disclosure relates to a technology that allows an electronic device to process image data.

2. Description of Related Art

As display devices with various performances are being supplied, various formats of image content are being provided. For example, high dynamic range (HDR) content for displaying an image as if a person perceives a target through his/her eyes by dividing a contrast more finely compared with conventional standard dynamic range (SDR) content is being provided. Also, as the performance of an electronic device is improved, devices capable of generating or editing dynamic range content are being gradually supplied.

In the case where a format of image content that a display device intends to display is a format that the display device does not support, the display device fails to display the image content normally. For example, in the case where a brightness range of HDR content exceeds the performance of the display device or the display device does not support an output of the HDR content, a color or grayscale of an original image may be distorted. In this case, an image that is different from an image intended in creating image content may be output through the display device.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure is to address a problem in which a quality-degraded image is generated or displayed when an electronic device generates or displays an image associated with image content.

In accordance with an example aspect of the disclosure, an electronic device may include a memory, and a processor electrically connected with the memory. The memory may store instructions that, when executed, cause the processor to control the electronic device to: obtain information about a maximum value of brightness of image content based on metadata of the image content, perform tone mapping on at least one frame corresponding to a preview image of the image content based on the information about the maximum value of the brightness, and output the preview image based on the at least one frame on which the tone mapping is performed on a display device.

In accordance with another example aspect of the disclosure, a method may include obtaining information about a maximum value of brightness of image content based on metadata of the image content, performing tone mapping on at least one frame corresponding to a preview image of the image content based on the information about the maximum value of the brightness, and generating the preview image based on the at least one frame on which the tone mapping is performed.

In accordance with another example aspect of the disclosure, a storage medium may store a program that, when executed, causes an electronic device to obtain information about a maximum value of brightness of image content based on metadata of the image content, to determine whether a state of the electronic device satisfies a specified output condition associated with an output of a preview image of the image content, to perform tone mapping on at least one frame corresponding to the preview image of the image content based on the information about the maximum value of the brightness based on the state of the electronic device not satisfying the specified output condition associated with the output of the preview image of the image content, and to generate the preview image based on the at least one frame on which the tone mapping is performed.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to description of drawings, similar components may be referred to using similar reference numerals.

DETAILED DESCRIPTION

Hereinafter, various example embodiments of the disclosure will be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
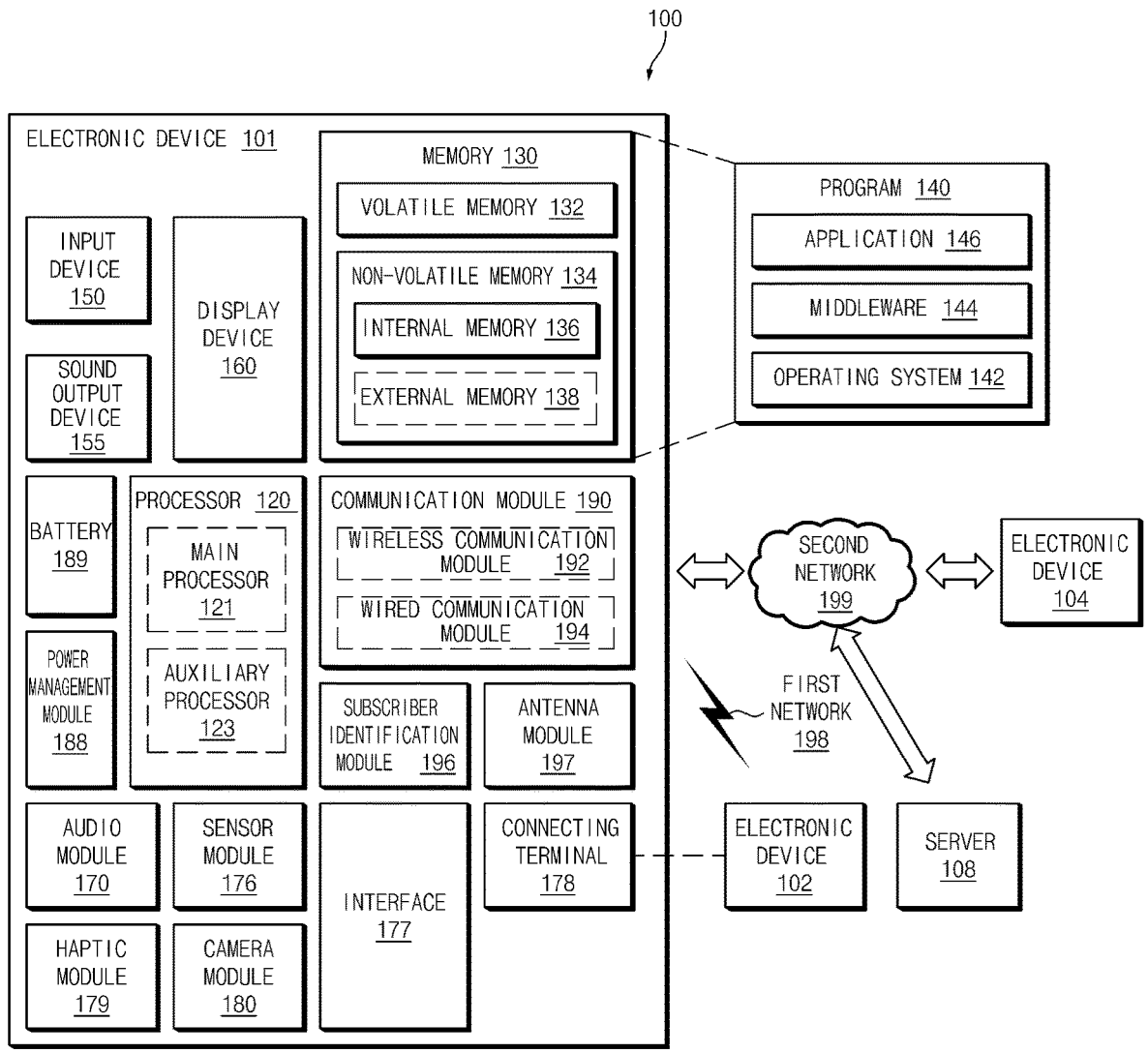
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Below, an example embodiment in which image content is high dynamic range (HDR) content will be described as a representative non-limiting example of image content.

Figure 2:
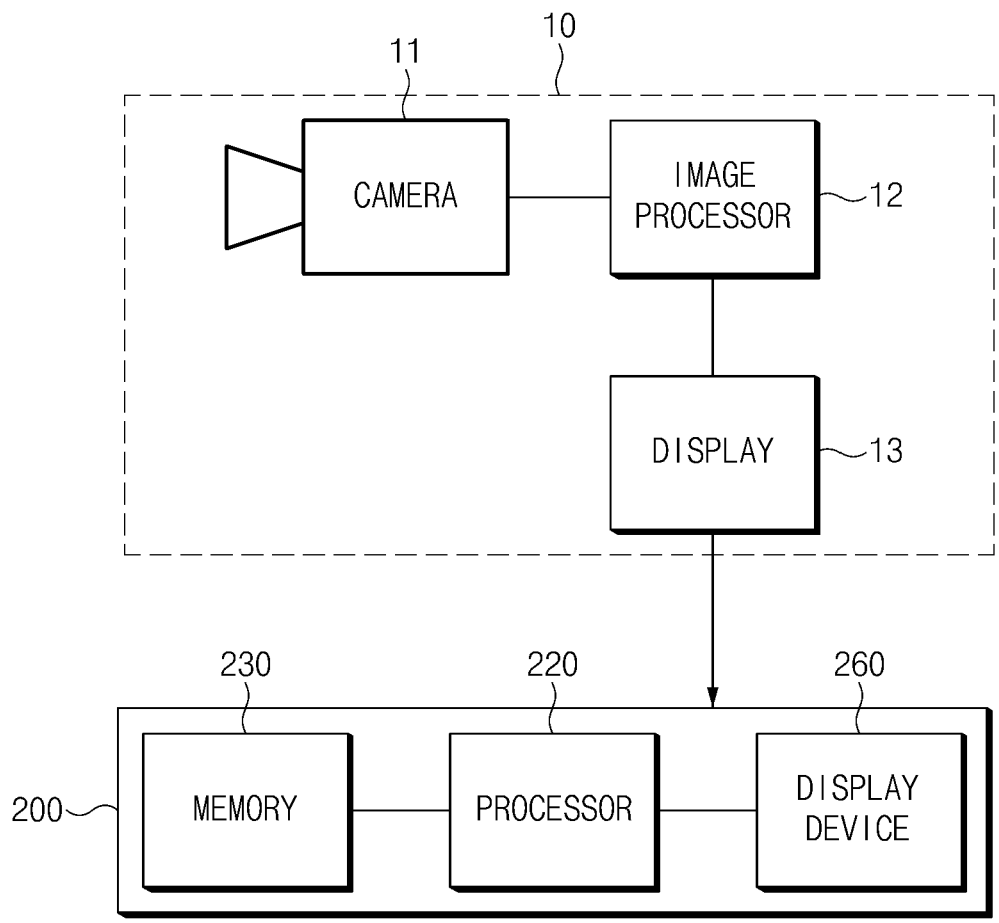
FIG. 2 is a block diagram illustrating an example structure of an electronic device and an example configuration of a system mastering image content and providing a result of the mastering to an electronic device, according to various embodiments.

FIG. 2 is a block diagram illustrating an example structure of an electronic device 200 and an example configuration of a system mastering image content and providing a result of the mastering to the electronic device 200, according to various embodiments.

According to an embodiment, image content may be created by an image content creation system 10 that may be provided, for example, at a studio. For example, in the case of the HDR content, an image processor (e.g., including image processing circuitry) 12 may process sensor image photographed through a camera 11 and may generate an HDR image. The generated HDR image may be displayed through a display 13 capable of displaying the HDR image. A user of the image content creation system 10 may identify the HDR image displayed on the display 13. When it is determined that it is necessary to adjust the HDR image, the user that identifies the HDR image may adjust the camera 11 or may adjust the HDR image. Accordingly, in the case of the HDR image generated by the image content creation system 10, the probability that an HDR image is generated within the limit of image reproduction of the display 13 is high. For example, in the case where the maximum brightness (or luminance) of the display 13 is 10000 nit, the HDR image generated by the image content creation system 10 may be an image, of which a maximum brightness value is 10000 nit.

According to an embodiment, the electronic device 200 may include a processor (e.g., including processing circuitry) 220 (e.g., the processor 120 of FIG. 1), a memory 230 (e.g., the memory 130 of FIG. 1), and a display device (e.g., including a display) 260 (e.g., the display device 160 of FIG. 1). The processor 220 may include various processing circuitry and execute instructions stored in the memory 230 to process data or to control the electronic device 200 and/or various components thereof. An operation of an electronic device or a processor disclosed in the disclosure may be performed when the processor executes an instruction stored in a memory.

The electronic device 200 may be provided with image content created by the image content creation system 10. The processor 220 may reproduce the provided image content and may output an image included in the image content through the display device 260. However, in the case where the electronic device 200 fails to support a maximum brightness value of the image content, the image content may not be output normally. For example, in the case where image content is HDR content with the maximum brightness of 1000 nit or in the case where the display device 260 is a standard dynamic range (SDR) display device having the maximum brightness of 100 nit, the electronic device 200 may fail to normally output the image content due to a limitation on an expressible brightness value. The standard dynamic range that is a contrast to the HDR in concept may refer, for example, to a format of an image, of which a dynamic range is small compared to the HDR. For another example, even though the display device 260 is an HDR display device in which a maximum brightness value is equal to or greater than a maximum brightness value of the image content, in the case where an operating mode of the electronic device 200 is set to an SDR operating mode that does not support the reproduction of the HDR content, the HDR content may not be reproduced normally. The above are merely examples, and it will be understood that the disclosure is not limited to these specific examples.

According to an embodiment, the electronic device 200 may generate an image associated with the image content. For example, in the case where an event that the generation of a preview image of the image content is required occurs, the processor 220 may generate the preview image of the image content. An example of the event that the generation of the preview image is required occurs will be described in greater detail below with reference to FIGS. 3, 4, and 5.

However, even though the preview image is generated using a frame(s) or the like included in the image content, in the case where the electronic device 200 fails to support the maximum brightness value of the image content, the image content may not be output normally. According to an embodiment, the processor 220 may generate an image (e.g., a preview image) of the image content based on a result of performing tone mapping on the frame(s) of the image content to a range that the electronic device 200 is capable of expressing. In the case where the image content includes an HDR image and the display device 260 of the electronic device 200 is an SDR display device, the generated preview image may be a standard dynamic range image that is obtained by converting HDR image of the frame(s) (e.g., a frame corresponding to the preview image) of the image content.

To perform the tone mapping, the processor 220 may need to decide (e.g., determine) a maximum value of the brightness of the image content and a maximum value of the brightness capable of being expressed by the display device 260. According to an embodiment, the processor 220 may obtain information about the maximum value of the brightness of the image content based on metadata of the image content. The processor 220 may obtain information about the maximum value of the brightness capable of being expressed by the display device 260 from a setting value of the electronic device 200 or device information of the display device 260, etc.

According to an embodiment, the processor 220 may perform the tone mapping on the image content based on the information about the maximum value of the brightness of the image content. The processor 220 may output a preview image, obtained by converting at least one frame of the image content based on a result of performing the tone mapping, on the display device 260. The processor 220 may output the preview image through another device (e.g., the electronic device 102 of FIG. 1 or the electronic device 104). In the disclosure, in general, the "tone mapping on image content" may include, for example, and without limitation, an appropriate one of tone mapping on one of frames of the image content, tone mapping on a plurality of frames of the frames of the image content, tone mapping on all the frames of the image content, or the like. For example, in the case of generating a thumbnail image of an HDR image (or video), the tone mapping may be performed on one sheet of frame corresponding to the thumbnail image from among the frames of the image content. In the case where an edit program to edit an HDR video is executed or a program (e.g., a video player program) to provide a plurality of thumbnails with regard to one HDR video is executed, the tone mapping may be performed for each frame to be output through the display device 260. An example in which the tone mapping is performed on all frames of an HDR image is not excluded from the disclosure.

Also, according to another embodiment, the image content creation system 10 may be included in the electronic device 200. For example, the electronic device 200 may create or edit image content. In this case, the display 13 may be included in the display device 260, and the image processor 120 may be implemented using the memory 230 and the processor 220.

According to another embodiment, even though image content is provided through another device, the electronic device 200 may generate a preview image of the image content. For example, even though image content is provided through, for example, an instant messenger (IM) service, the electronic device 200 may generate a preview image of the image content, which is appropriate to output at the electronic device 200. For example, the electronic device 200 may be provided with image content from another device (e.g., the electronic device 104 of FIG. 1) through a server (e.g., the server 108 of FIG. 1) that provides the IM service. For another example, even in the case of copying image content into the electronic device 200 from an external device (e.g., the electronic device 102 of FIG. 1) through a P2P connection, a cable, or the like, the electronic device 200 may generate a preview image appropriate to output at the electronic device 200. For another example, even in the case of downloading image content uploaded onto a cloud drive, the electronic device 200 may generate a preview image appropriate to output at the electronic device 200.

Figure 3:
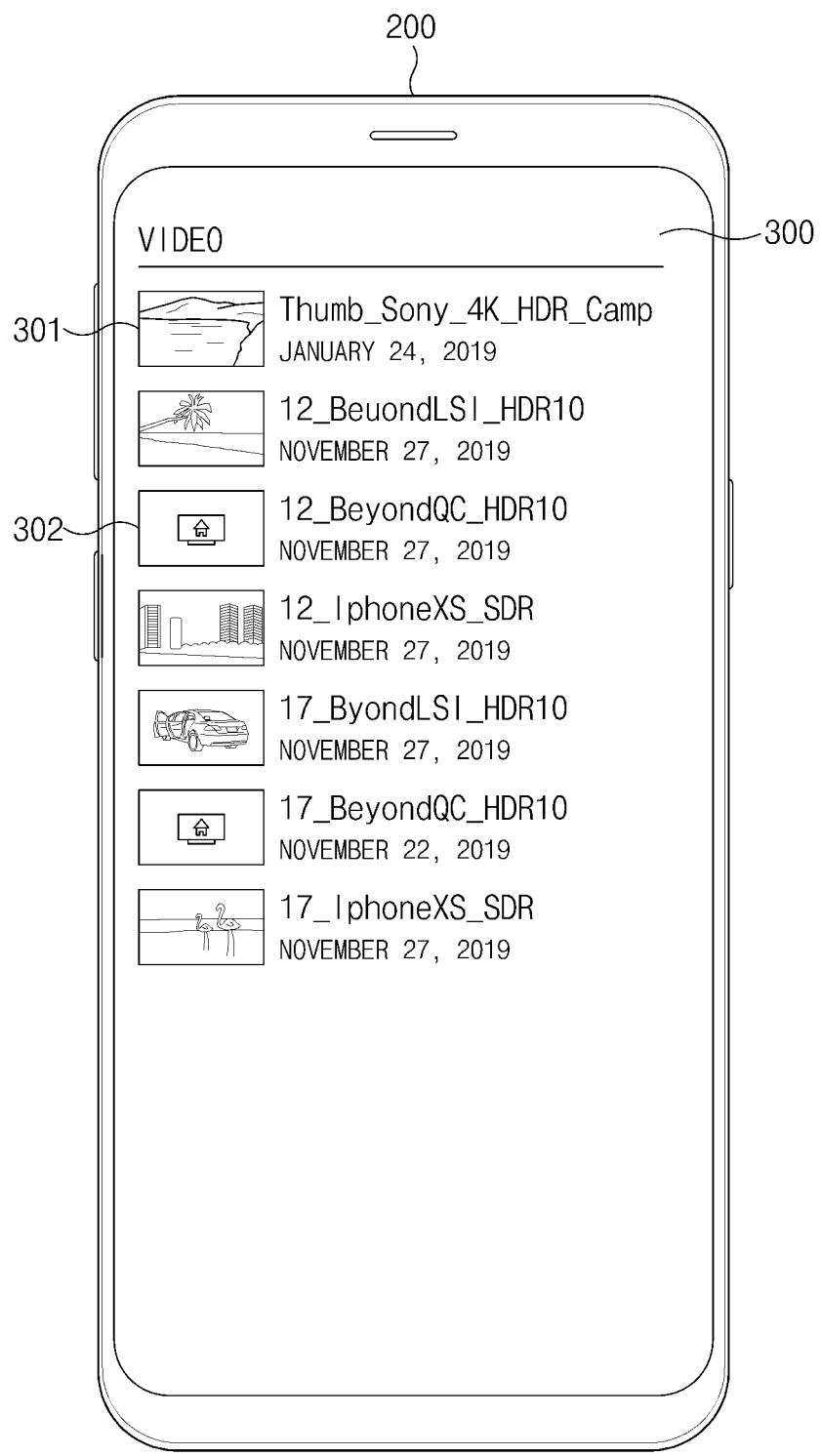
FIG. 3 is a diagram illustrating an example in which an electronic device displays a screen including a thumbnail according to various embodiments.

FIG. 3 is a diagram illustrating an example in which the electronic device 200 displays a screen including a thumbnail according to various embodiments.

According to an embodiment, the electronic device 200 may photograph an image or may download image content, and may execute an application (e.g., a gallery application) displaying a list of images. The electronic device 200 may output a screen 300 including the list of images through a display device (e.g., the display device 260 of FIG. 2), as an execution result of the application. In the case of entering the image list screen 300, the electronic device 200 may recognize that an event that the generation of a preview image of image content is required occurs.

The electronic device 200 may generate a thumbnail image 301 of the image content and may include the thumbnail image 301 in the screen 300. However, in the case of outputting, as the thumbnail image 301, an image that is not appropriately tone mapped, the thumbnail image 301 that is displayed by the electronic device 200 may be output in a state where an image quality is degraded, for example, in a state where grayscale is lost or in a state where a color is differently expressed. In the case where the generation of a thumbnail image is not supported (e.g., in the case where an electronic device does not support to generate a thumbnail image of an HDR image), a default image 302 (e.g., an icon indicating a video or an image indicating a file format such as mp4 or avi) or an empty box may be displayed. In other words, a thumbnail image may not be displayed normally.

Figure 4:
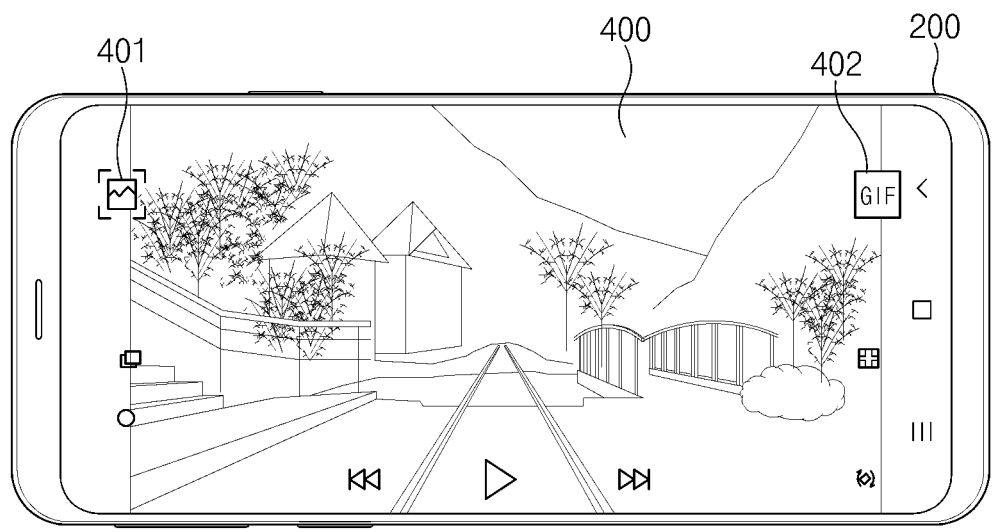
FIG. 4 is a diagram illustrating an example of an example user interface that allows an electronic device to generate an image associated with image content according to various embodiments.

FIG. 4 is a diagram illustrating an example of a user interface that allows the electronic device 200 to generate an image associated with image content according to various embodiments.

The electronic device 200 may output a screen 400 reproducing image content through a display device (e.g., the display device 260 of FIG. 2). According to an embodiment, the electronic device 200 may output a user interface 401 for receiving a user input to generate a still image obtained by capturing a frame of image content being played. According to an embodiment, in the case where the electronic device 200 receives a user input to select the user interface 401, the electronic device 200 may recognize that an event that the generation of a preview image of image content is required occurs. However, FIG. 4 is merely an example, and the electronic device 200 may receive a user input to capture image content through another way (e.g., an input through a physical button or a gesture input), not a user interface displayed on a display device.

According to an embodiment, the electronic device 200 may output a user interface 402 for generating a GIF file using a plurality of frames of image content. According to an embodiment, in the case where the electronic device 200 receives a user input to select the user interface 402, the electronic device 200 may recognize that an event that the generation of a preview image of image content is required occurs.

Figure 5:
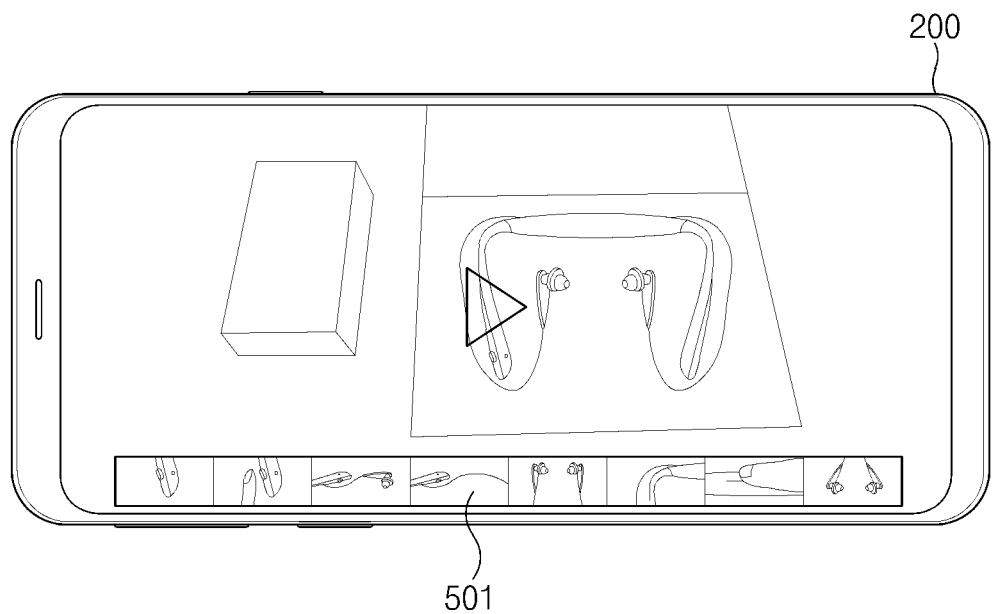
FIG. 5 is a diagram illustrating an example of a screen including an image for editing or searching for image content at an electronic device according to various embodiments.

FIG. 5 is a diagram illustrating an example of a screen including an image for editing or searching for image content at the electronic device 200 according to various embodiments.

According to an embodiment, the electronic device 200 may display a search bar 501 in which at least some frames included in image content are listed in the order of time, as an execution result of an edit application for editing image content or a player application for reproducing image content. According to an embodiment, in the case where an electronic device 200 executes the edit application or the player application or in the case where the electronic device 200 enters a screen displaying the search bar 501 including preview images according to a timeline of images, the electronic device 200 may recognize that an event that the generation of a preview image of image content is required occurs.

Figure 6:
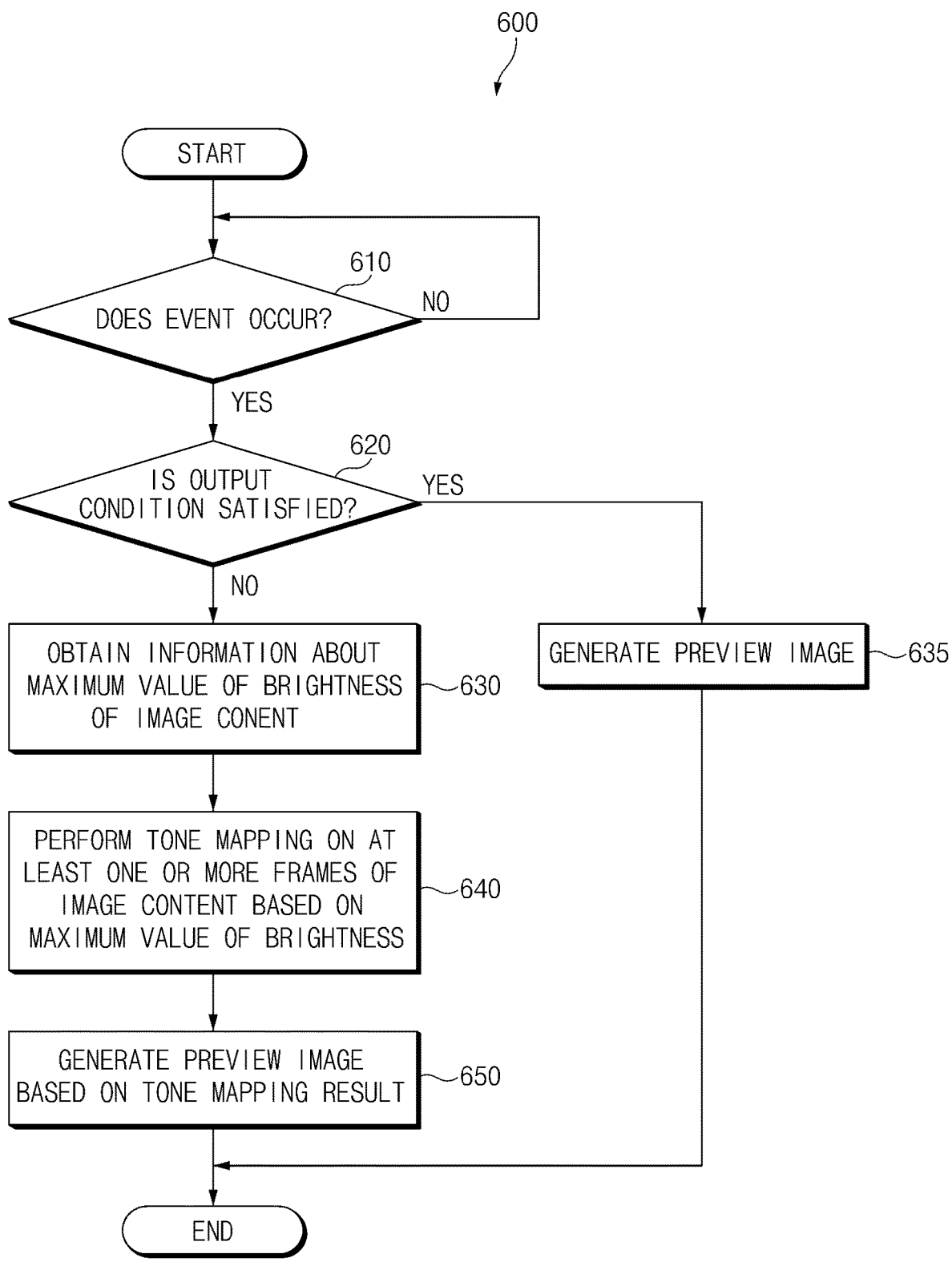
FIG. 6 is a flowchart illustrating an example process in which an electronic device generates a preview image, according to various embodiments.

FIG. 6 is a flowchart 600 illustrating an example process in which an electronic device (e.g., the electronic device 100 of FIG. 1 or the electronic device 200 of FIG. 2) generates a preview image, according to various embodiments.

In operation 610, an electronic device may determine whether an event requiring generation of an image associated with image content occurs.

In operation 620, the electronic device may determine whether the image content satisfies an output condition of the electronic device. For example, in the case where a display device of the electronic device is an SDR display device, the electronic device may determine whether the image content is an HDR image, through, for example, a PQ value included in metadata of the image content. When the image content is the HDR image, the electronic device may determine that the image content does not satisfy the output condition. According to another embodiment, in the case where the image content is the HDR image and the electronic device does not operate in an operating mode to support an output of the HDR image, the electronic device may determine that the image content does not satisfy the output condition.

For another example, the electronic device may obtain information about a maximum value of the brightness of the image content from the metadata of the image content and may determine whether the image content satisfies the output condition, based on the maximum value of the brightness thus obtained. For example, the electronic device may obtain a value (hereinafter referred to, for example, as a "maximum mastering display brightness value") of "Max_Mastering_Display_Luminance" associated with a maximally expressible brightness value of a display (e.g., the display 13 of FIG. 2) used when mastering image data or a "MaxCLL" value indicating a maximum content light level (CLL) of an image included in the image content from the metadata of the image content. When the obtained value is greater than a maximum brightness value that the display device of the electronic device has or supports, the electronic device may determine that the output is not satisfied.

For another example, the electronic device may obtain the information about the maximum value of the brightness of the image content based on a result of analyzing an image and may determine whether the image content satisfies the output condition, based on the maximum value of the brightness thus obtained.

When the image content satisfies the output condition, in operation 635, the electronic device may generate a frame of the image content as a preview image. According to an embodiment, the preview image may be generated without a need to perform a separate tone mapping operation in operation 635.

When the image content does not satisfy the output condition, in operation 630, the electronic device may obtain the information about the maximum value of the brightness of the image content. However, depending on an embodiment, operation 630 may be included in operation 620 in the case of obtaining the information about the maximum value of the brightness of the image content in operation 620.

In operation 640, the electronic device may perform tone mapping on at least one or more frames corresponding, for example, to the preview image, of the image content based on the maximum value of the brightness thus obtained. In operation 650, the electronic device may generate a tone mapped image as a preview image based on a result of the tone mapping.

Figure 7:
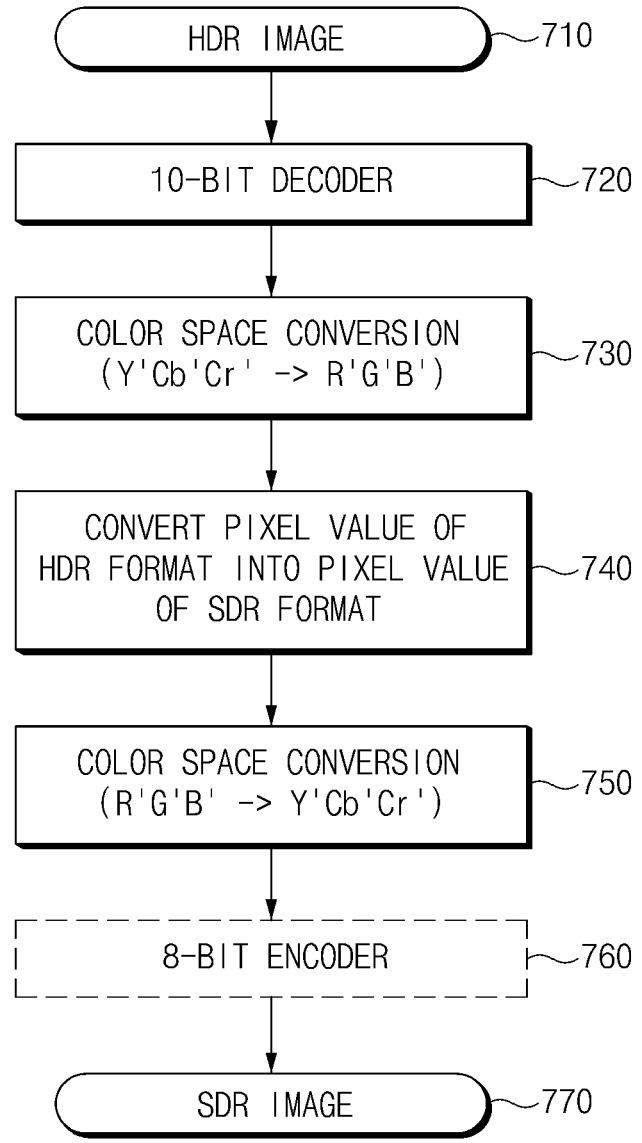
FIG. 7 is a flowchart illustrating an example process of converting an HDR image into an SDR image, according to various embodiments.

FIG. 7 is a flowchart illustrating an example process of converting an HDR image into an SDR image, according to various embodiments.

When image content includes an HDR image 710, an electronic device may decode the HDR image 710 using, for example, a 10-bit decoder 720 in operation 720. The electronic device may obtain metadata of the image content as a result of performing the decoding.

The electronic device may perform color space conversion 730 on the decoded HDR image 710. For example, an Y'Cb'Cr' color space of the HDR image may be converted into an R'G'B' color space.

The electronic device may perform operation 740, in which a pixel value of an HDR format is converted into a pixel value of an SDR format. In operation 740, the electronic device may perform tone mapping for the purpose of performing the conversion procedure. To perform the tone mapping, the electronic device may use metadata of image data.

The electronic device may perform color space conversion 750 on the image content converted into the SDR format. The electronic device may encode a result of the color space conversion 750 thus performed and may output an SDR image 770. However, an 8-bit encoder 760 relates to an example embodiment; according to another example embodiment, the result of the color space conversion 750 may be encoded to a 10-bit image with a narrow gamut.

Figure 8:
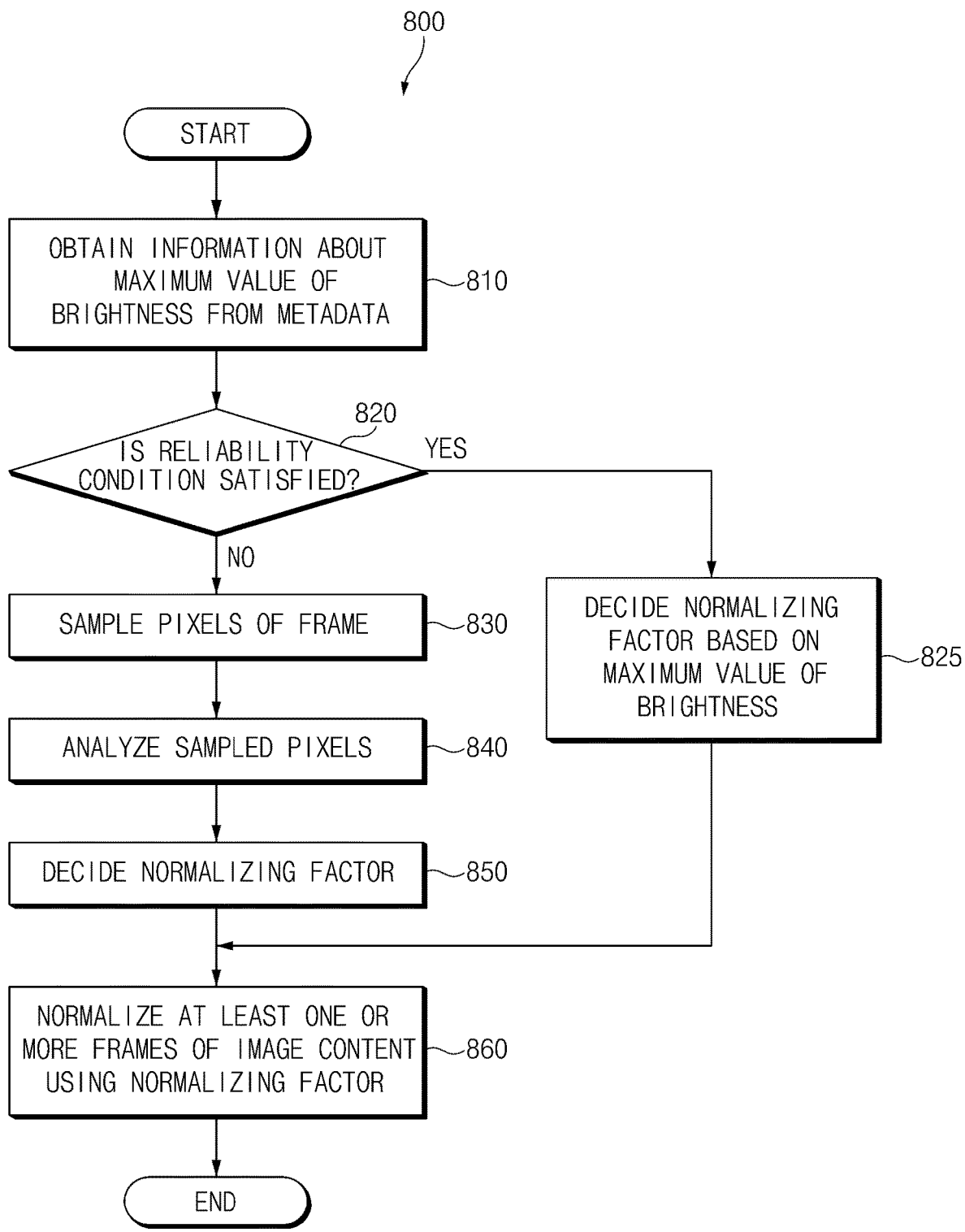
FIG. 8 is a flowchart illustrating an example process in which an electronic device decides a normalizing factor for tone mapping and normalizes image content, according to various embodiments.

FIG. 8 is a flowchart 800 illustrating an example process in which an electronic device decides (e.g., determines) a normalizing factor for tone mapping and normalizes image content, according to various embodiments. For example, the process illustrated in FIG. 8 may be included in at least one of operation 630 or operation 640.

In operation 810, an electronic device may obtain information about a maximum value of brightness from metadata. For example, the electronic device may obtain a maximum mastering display brightness value associated with a maximally expressible brightness value of a display (e.g., the display 13 of FIG. 2) used when mastering image data or a "MaxCLL" value indicating a maximum content light level (CLL) of an image included in image content from metadata of the image content.

In operation 820, the electronic device may determine whether the information about the maximum value of the brightness obtained from the metadata satisfies a reliability condition. The reliability condition may refer, for example, to a condition for determining whether the information about the maximum value of the brightness is reliable information. For example, the reliability condition may define that the maximum mastering display brightness value and the maximum content light level are identical in value and have a value being not "0". In the case where the maximum mastering display brightness value is a value different from the maximum content light level, a maximum brightness value for content of the metadata included in the image content when generating the content may not be accurate. In this case, thus, the electronic device may determine whether the information about the maximum value of the brightness does not satisfy the reliability condition.

When the information about the maximum value of the brightness obtained from the metadata satisfies the reliability condition, in operation 825, the electronic device may decide a normalizing factor based on the maximum value of the brightness obtained from the metadata.

When the information about the maximum value of the brightness obtained from the metadata does not satisfy the reliability condition, in operation 830, the electronic device may sample pixels of a frame included in the image content. According to an embodiment, operation 830 may be performed based on a system situation of the electronic device. For example, in the case where a memory of the electronic device is insufficient, computational burden is great, or a power is insufficient, the electronic device may sample some of the pixels of the frame. According to another embodiment, operation 830 may be omitted, and all the pixels of the frame may be analyzed in operation 840.

In operation 840, the electronic device may analyze the sampled pixels. For example, the electronic device may decide a maximum value of a pixel value (e.g., a "Y" or RGB value) according to a color space of the frame. For another example, the electronic device may analyze a histogram of the pixel value depending on the color space of the frame. According to an embodiment, the electronic device may obtain the information about the maximum value of the brightness of the image content, as a result of analyzing pixels.

In operation 850, the electronic device may decide a normalizing factor based on a result of the analysis.

When the normalizing factor is decided, in operation 860, the electronic device may perform a normalization operation on at least one frame of the image content using the decided normalizing factor.

Figure 9:
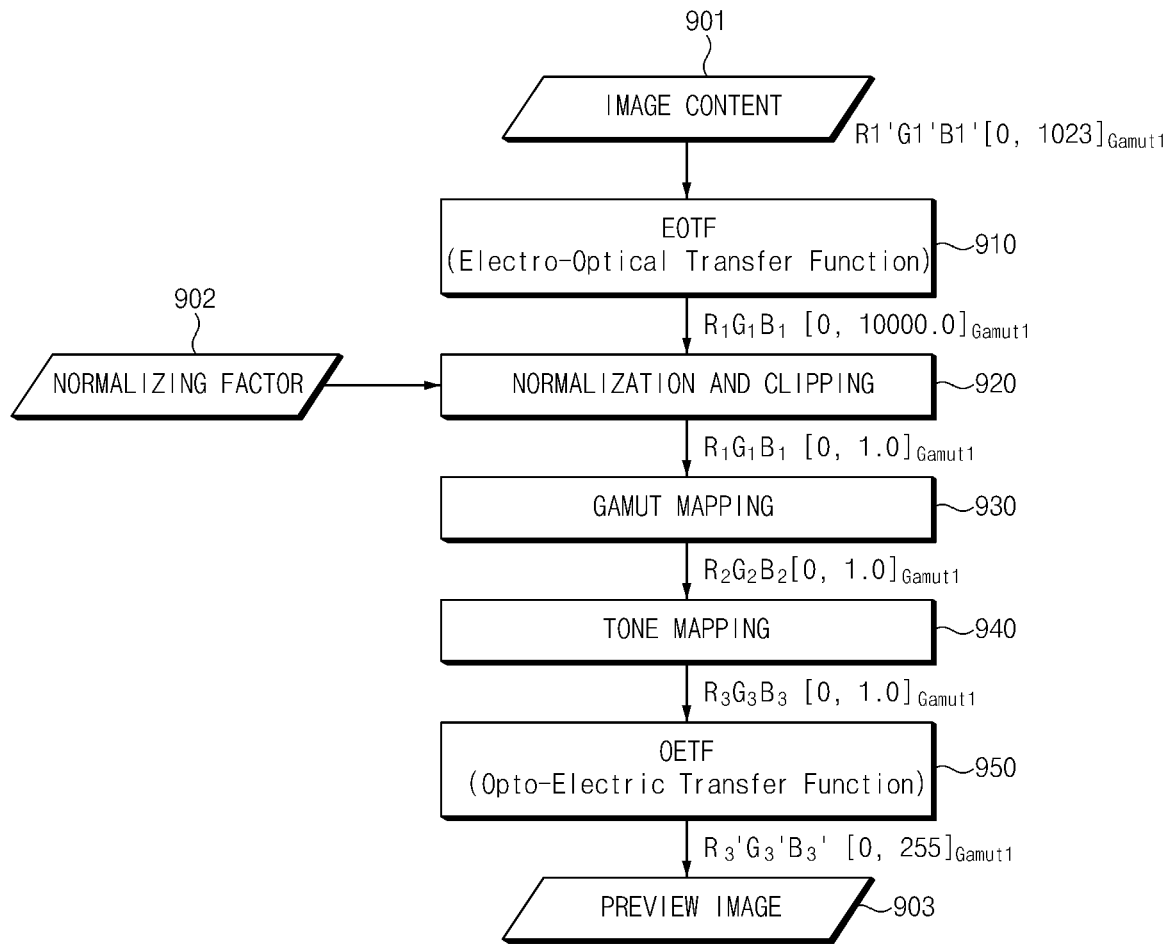
FIG. 9 is a flowchart illustrating an example process in which an electronic device generates a preview image based on tone mapping, according to various embodiments.

FIG. 9 is a flowchart illustrating an example process in which an electronic device generates a preview image based on tone mapping, according to various embodiments. According to an embodiment, the process illustrated in FIG. 9 may be executed when an electronic device performs an operation (e.g., operation 740 of FIG. 7) in which a pixel value of an HDR format is converted into a pixel value of an SDR format.

In operation 910, the electronic device may perform electro-optical transfer function (EOTF) conversion on image content 901 using an EOTF. For example, referring to FIG. 9, the electronic device may convert image content expressed by a 10-bit RGB value "$R_1'G_1'B_1'$ [0, 1023]$_{Gamut1}$" of a range from 0 to 1023 into an RGB value "$R_1G_1B_1$ [0, 10000.0]$_{Gamut1}$" expressed by a brightness value of a range from 0 to 10000.

In operation 920, the electronic device may perform normalization and clipping on the EOTF-converted image content based on a normalizing factor 902 (e.g., a normalizing factor decided as a result of performing operation 825 or operation 850 of FIG. 8). For example, referring to FIG. 9, the electronic device may normalize the RGB value "$R_1G_1B_1$ [0, 10000.0]$_{Gamut1}$" expressed by the brightness value of the range from 0 to 10000 to an RGB value "$R_1G_1B_1$ [0, 1.0]$_{Gamut1}$" expressed by a value of a range from 0 to 1 based on the normalizing factor.

In operation 930, the electronic device may perform gamut mapping on the normalized RGB value. For example, referring to FIG. 9, the electronic device may map the normalized RGB value (e.g., "$R_1G_1B_1$ [0, 1.0]$_{Gamut1}$") onto an RGB value (e.g., "$R_2G_2B_2$ [0, 1.0]$_{Gamut1}$") mapping a gamut. In operation 940, the electronic device may perform tone mapping. For example, referring to FIG. 9, a tone mapped RGB value (e.g., "$R_3G_3B_3$ [0, 1.0]$_{Gamut1}$") may be decided based on a maximum brightness value of a display device (e.g., the display device 260 of FIG. 2) of the electronic device and a maximum brightness value of the image content 901.

In operation 950, the electronic device may perform opto-electric transfer function (OETF) conversion on the tone mapped RGB value using an OETF and may generate a preview image 903 of an SDR format. For example, referring to FIG. 9, the electronic device may convert the tone mapped RGB value (e.g., "$R_3G_3B_3$ [0, 1.0]$_{Gamut1}$") into a 8-bit RGB value (e.g., "$R_3'G_3'B_3'$ [0, 255]$_{Gamut1}$").

According to an example embodiment, an electronic device may include a memory, and a processor electrically connected with the memory. The memory may store instructions that, when executed, cause the processor to control the electronic device to: obtain information about a maximum value of brightness of image content based on metadata of the image content, perform tone mapping on at least one frame corresponding to a preview image of the image content based on the information about the maximum value of the brightness, and output the preview image based on the at least one frame on which the tone mapping is performed on a display device.

According to an example embodiment, the image content may include a high dynamic range image, and the preview image may include a standard dynamic range image.

According to an example embodiment, the instructions, when executed, may cause the processor to control the electronic device to obtain the information about the maximum value of the brightness based on a state of the electronic device not satisfying a specified output condition associated with an output of the preview image of the image content, and the state of the electronic device that does not satisfy the specified output condition may include at least one of a the electronic device not supporting an output of a high dynamic range format or the electronic device not operating in an operating mode to support the output of the high dynamic range format.

According to an example embodiment, the instructions, when executed, may cause the processor to control the electronic device to normalize the at least one frame of the image content using the maximum value of the brightness as a normalizing factor based on the information about the maximum value of the brightness satisfying a specified reliability condition.

According to an example embodiment, the instructions, when executed, may cause the processor to control the electronic device to: decide (e.g., determine) a normalizing factor based on a result of analyzing pixel values of a frame of the image content based on the information about the maximum value of the brightness not satisfying a specified reliability condition, and normalize the at least one frame of the image content using the normalizing factor.

According to an example embodiment, the instructions, when executed, may cause the processor to control the electronic device to: decide a sample pixel sampled from pixels of the frame, and decide the normalizing factor based on a result of analyzing the sample pixel.

According to an example embodiment, the instructions, when executed, may cause the processor to control the electronic device to decide the normalizing factor based on a result of analyzing a maximum value of a "Y" value or an RGB value of pixels of the frame or a histogram of the "Y" value or the RGB value.

According to an example embodiment, the instructions, when executed, may cause the processor to control the electronic device to store the decided normalizing factor in a user area of the memory in the form of metadata.

According to an example embodiment, the information about the maximum value of the brightness may include a maximum mastering display brightness value of a display used to master the image content and a maximum content light level of an image included in the image content.

According to an example embodiment, the specified reliability condition may include a condition that the maximum mastering display brightness value and the content light level are identical in value and are not 0.

According to an example embodiment, the processor may control the electronic device to: perform the tone mapping based on at least one of generating a thumbnail image of the image content, there being a changed location where the image content is stored, displaying an image for editing the image content on the display device, a still image capture command for the image content being received, an edit application for editing the image content being executed, or a command for changing the image content into another file format being received.

According to another example embodiment, a preview image generating method of an electronic device may include: obtaining information about a maximum value of brightness of image content based on metadata of the image content, performing tone mapping on at least one frame corresponding to a preview image of the image content based on the information about the maximum value of the brightness, and generating the preview image based on the at least one frame on which the tone mapping is performed.

According to an example embodiment, the image content may include a high dynamic range image, and the preview image includes a standard dynamic range image.

According to an example embodiment, the performing of the tone mapping may include determining whether a state of the electronic device satisfies a specified output condition associated with an output of the preview image of the image content, and performing the tone mapping based on the state of the electronic device not satisfying a specified output condition associated with an output of the preview image, and based on the electronic device not satisfying the specified output condition may include at least one of a the electronic device not supporting an output of a high dynamic range format or the electronic device not operating in an operating mode to support the output of the high dynamic range format.

According to an example embodiment, the performing of the tone mapping may include determining whether the information about the maximum value of the brightness satisfies a specified reliability condition, deciding a normalizing factor based on a result of analyzing pixel values of a frame of the image content based on the information about the maximum value of the brightness not satisfying the specified reliability condition, and normalizing the at least one frame of the image content using the normalizing factor.

According to an example embodiment, the deciding of the normalizing factor may include sampling pixels of the frame, and deciding the normalizing factor based on a result of analyzing the sampled pixels.

According to an example embodiment, the information about the maximum value of the brightness may include a maximum mastering display brightness value of a display used to master the image content and a maximum content light level of an image included in the image content.

According to an example embodiment, the specified reliability condition may include a condition that the maximum mastering display brightness value and the content light level are identical in value and are not 0.

According to an example embodiment, the performing of the tone mapping may include normalizing the at least one frame of the image content using a normalizing factor stored in a memory of the electronic device based on the normalizing factor being included in metadata stored in a user area of the memory.

According to an example embodiment, the performing of the tone mapping may be made to generate a thumbnail image of the image content, based on at least one of: there being a changed location where the image content is stored, displaying an image for editing the image content on the display device, a still image capture command for the image content being received, an edit application for editing the image content being executed, or a command for changing the image content into another file format being received.

An electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various example embodiments of the disclosure may generate or display an image, the quality of which is not degraded.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device comprising:
a memory; and
a processor electrically connected with the memory,
wherein the memory stores instructions that, when executed, cause the processor to control the electronic device to:
obtain information about a maximum brightness value of image content based on metadata of the image content;
determine whether the maximum brightness value satisfies a first condition associated with reliability of the maximum brightness value;
determine a normalizing factor according to a first operation based on the maximum brightness value being determined to satisfy the first condition or according to a second operation different from the first operation based on the maximum brightness value being determined to not satisfy the first condition;
perform tone mapping on at least one frame corresponding to a thumbnail image of the image content based on the determined normalizing factor; and
control to output the thumbnail image based on the at least one frame on which the tone mapping is performed, on a display device.

2. The electronic device of claim 1, wherein the image content includes a high dynamic range image, and the thumbnail image includes a standard dynamic range image.

3. The electronic device of claim 2, wherein the instructions, when executed, cause the processor to control the electronic device to:
obtain the information about the maximum brightness value based on a state of the electronic device being determined to not satisfy a second condition associated with output of the thumbnail image of the image content,
wherein the state of the electronic device that does not satisfy the second condition includes at least one of the electronic device not supporting output of a high dynamic range format or the electronic device not operating in an operating mode supporting the output of the high dynamic range format.

4. The electronic device of claim 1, wherein the first operation comprises:
determining the normalizing factor based on the maximum brightness value.

5. The electronic device of claim 1, wherein the second operation comprises:
determining the normalizing factor based on analysis of pixel values of a frame of the image content.

6. The electronic device of claim 5, wherein the pixel value analysis comprises:
identifying pixels sampled from the frame; and
determining the normalizing factor based on analysis of the sample pixel.

7. The electronic device of claim 5, wherein the second operation is based on a maximum value of a luminance (Y) value or a red green blue (RGB) value of pixels of the frame, or a histogram of the Y value or the RGB value.

8. The electronic device of claim 5, wherein the instructions, when executed, cause the processor to control the electronic device to:
store the determined normalizing factor as metadata in a user area of the memory.

9. The electronic device of claim 5, wherein the information about the maximum brightness value includes a maximum mastering display brightness value of a display used to master the image content and a maximum content light level of an image included in the image content.

10. The electronic device of claim 9, wherein the first condition includes a condition that the maximum mastering display brightness value and the content light level are identical in value and are not zero.

11. The electronic device of claim 1, wherein the processor is configured to control the electronic device to:
perform the tone mapping to generate the thumbnail image of the image content, based on at least one of: a changed location where the image content is stored, displaying an image for editing the image content on the display device, a still image capture command for the image content being received, an edit application for editing the image content being executed, or a command for changing the image content into another file format being received.

12. A thumbnail image generating method of an electronic device, the method comprising:
obtaining information about a maximum brightness value of image content based on metadata of the image content;
determining whether the maximum brightness value satisfies a first condition associated with reliability of the maximum brightness value;
determining a normalizing factor according to first operation based on the maximum brightness value being determined to satisfy the first condition or according to a second operation different from the first operation based on the maximum brightness value being determined to not satisfy the first condition;
performing tone mapping on at least one frame corresponding to a thumbnail image of the image content, based on the determined normalizing factor; and
outputting, to a display device, the thumbnail image based on the at least one frame on which the tone mapping is performed.

13. The method of claim 12, wherein the image content includes a high dynamic range image, and the thumbnail image includes a standard dynamic range image.

14. The method of claim 13, further comprising:
determining whether a state of the electronic device satisfies a second condition associated with output of the thumbnail image of the image content; and
obtaining the information about the maximum brightness value based on the state of the electronic device being determined to not satisfy the second condition, and
wherein the state of the electronic device not satisfying the second condition includes at least one of: the electronic device not supporting output of a high dynamic range format or the electronic device not operating in an operating mode supporting output of the high dynamic range format.

15. The method of claim 12, wherein the second operation comprises:
determining the normalizing factor based on analysis of pixel values of a frame of the image content.

16. The method of claim 15, further comprising:
sampling pixels from the frame; and
determining the normalizing factor based on analysis of the sampled pixels.

17. The method of claim 15, wherein the information about the maximum brightness value includes a maximum mastering display brightness value of a display used to master the image content and a maximum content light level of an image included in the image content.

18. The method of claim 17, wherein the first condition includes a condition that the maximum mastering display brightness value and the content light level are identical in value and are not zero.

19. The method of claim 12, further comprising:
    storing the normalizing factor as metadata in a user area of memory.

20. The method of claim 12, wherein the performing of the tone mapping is based on at least one of: generating the thumbnail image of the image content, a changed location where the image content is stored, displaying an image for editing the image content on the display device, a still image capture command for the image content being received, an edit application for editing the image content being executed, or a command for changing the image content into another file format being received.

\* \* \* \* \*